United States Patent
Dimperio et al.

(10) Patent No.: US 6,965,445 B2
(45) Date of Patent: Nov. 15, 2005

(54) SYSTEMS AND METHODS OF AUTOMATING JOB TICKETING IN PRINTING, COPYING OR IMAGING DEVICES

(75) Inventors: Richard R. Dimperio, Rochester, NY (US); Thomas W. Busmire, Victor, NY (US); Ann M. Davidson, Canandaigua, NY (US); Allan J. Drew, Walworth, NY (US)

(73) Assignee: Xerox Corporation, Stamford, CT (US)

( * ) Notice: Subject to any disclaimer, the term of this patent is extended or adjusted under 35 U.S.C. 154(b) by 729 days.

(21) Appl. No.: 09/683,541

(22) Filed: Jan. 16, 2002

(65) Prior Publication Data

US 2003/0133134 A1    Jul. 17, 2003

(51) Int. Cl.[7] ............................................. G06F 15/00
(52) U.S. Cl. ...................... 358/1.15; 358/1.13; 715/500
(58) Field of Search ............................. 358/1.15, 1.13; 715/500

(56) References Cited

U.S. PATENT DOCUMENTS

| | | | |
|---|---|---|---|
| 5,999,945 A * | 12/1999 | Lahey et al. | 707/200 |
| 6,243,172 B1 * | 6/2001 | Gauthier et al. | 358/1.18 |
| 6,433,881 B1 * | 8/2002 | Lynch et al. | 358/1.13 |
| 6,581,097 B1 * | 6/2003 | Lynch et al. | 709/226 |
| 6,657,744 B2 * | 12/2003 | Lynch et al. | 358/1.15 |

* cited by examiner

*Primary Examiner*—King Y. Poon
*Assistant Examiner*—Lucas Divine
(74) *Attorney, Agent, or Firm*—Oliff & Berridge, PLC (57) ABSTRACT

Systems and methods are provided for creating hard-copy documents without requiring a concurrent creation of an individual job ticket for each document file submitted for document output. The document, or set of documents, are created by submitting documents file names having embedded text strings and/or additional parameters that correspond to preconfigured job tickets saved on a hard drive of an imaging system.

4 Claims, 6 Drawing Sheets

SYSTEMS AND METHODS OF AUTOMATING JOB TICKETING IN PRINTING, COPYING OR IMAGING DEVICES

BACKGROUND OF THE INVENTION

1. Field of Invention

This invention is directed generally to creating hard-copy documents from electronic file information.

2. Description of Related Art

Conventionally, job tickets are used to direct an imaging system to produce a designated number of documents in a designated format or style, such as, for example, simplex (single-sided) or duplex (double-sided), and/or with designated image processing procedures applied to the document. Accordingly, a document is created as specified in the job ticket attached to the document.

Figure 1:
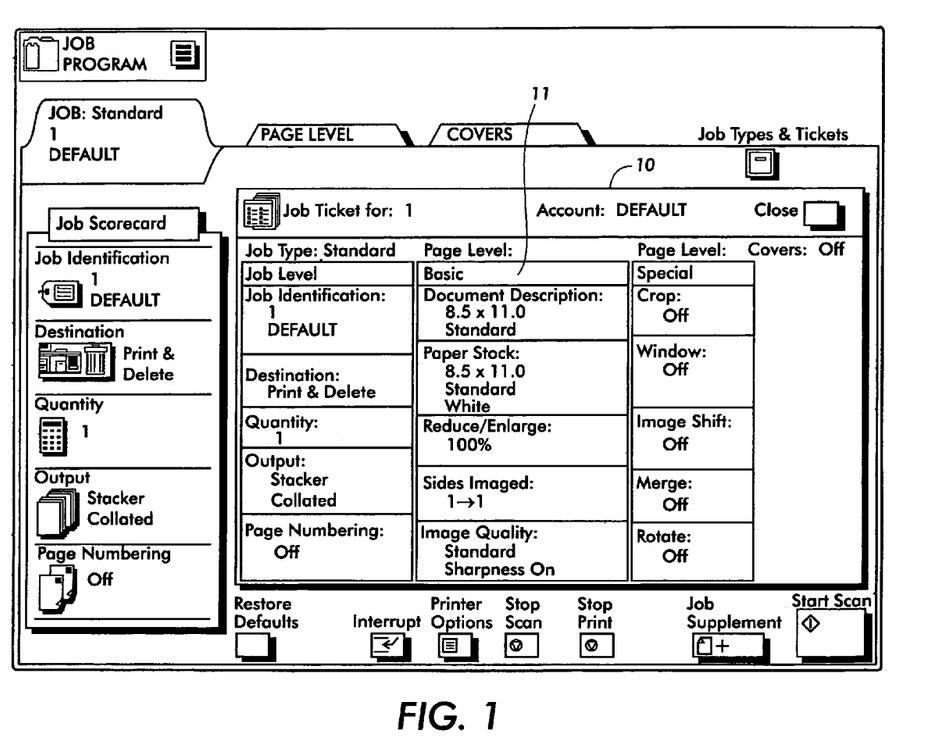
FIG. 1 illustrates a conventional job ticket and a subset of various parameters available for setting in a job ticket.

Setting the various parameters for each job ticket, however, is often a time-consuming task. FIG. 1 shows a conventional job ticket that includes only a subset of the various parameters that may be set to achieve a desired print product.

It is generally known that inputting individual job tickets for printers, copiers or imaging devices provides flexibility in page sequencing, copying and/or presentation as well as print type, format, etc. for each individual job submitted. The individual printing, copying or imaging parameters may be varied or manipulated by changing the parameters on any job ticket. However, the repeated entry of parameters by an operator is subject to error which could render useless an entire output based upon erroneously supplied job ticket parameters. Thus, not only is the creation of individual job tickets time-consuming, it is also subject to wasteful error and inefficiencies.

Moreover, it is becoming increasingly common to integrate on-line finishing devices with imaging systems, such as printers, copiers, facsimile machines, multifunction devices and the like. These on-line finishing devices directly receive sheets as they are output from the imaging system and perform various types of finishing operations on each sheet, or set of sheets, output by the imaging device. The finishing operations can be for example, binding, stitching, folding, trimming, aligning, rotating, punching, drilling, slitting, and/or perforating, and combinations of these processes. Any such finishing operation, however, requires additional parameters be embedded into and set in the corresponding job ticket. Thus, increased opportunities for errors, inefficiencies and time consumption arise as a result.

It is well known in this art, and in general, how to program and execute document handler, printer, copier or imaging device control functions with conventional or simple software instructions. Such software instructions may vary depending on the particular function and micoprocessor or microcomputer system being used, of course, but is still readily available to those skilled in the art. It is also known that conventional or specified document handling, printing, copying, or imaging functions and controls may be alternatively provided using various known or later developed logic and/or switching systems.

SUMMARY OF THE INVENTION

This invention provides systems and methods for submitting a print job without requiring a concurrent creation of an individual job ticket.

This invention separately provides systems and methods for assigning a file code name for a print job that identifies a previously created and repeatably available job ticket.

This invention separately provides systems and methods for embedding, in the file code name, values for a variety of print job services, such as, for example, quantity of copies desired, percentage of magnification or minimization, degree of image rotation or image shift, or the like recognizable by the corresponding job ticket previously created and repeatably available.

This invention separately provides systems and methods for creating and storing job tickets and for using such a job ticket according to a job file having a job file code name corresponding to that job ticket.

The systems and methods according to this invention allow job tickets to be more efficiently created and used, because errors in entering parameters in individual job tickets created concurrently with a desired print job are reduced, or ideally, minimized. Further, the time consuming task of preparing concurrent job tickets for each job can be reduced or avoided.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail with reference to the following figures, wherein.

DETAILED DESCRIPTION OF PREFERRED EMBODIMENTS

Figure 2:
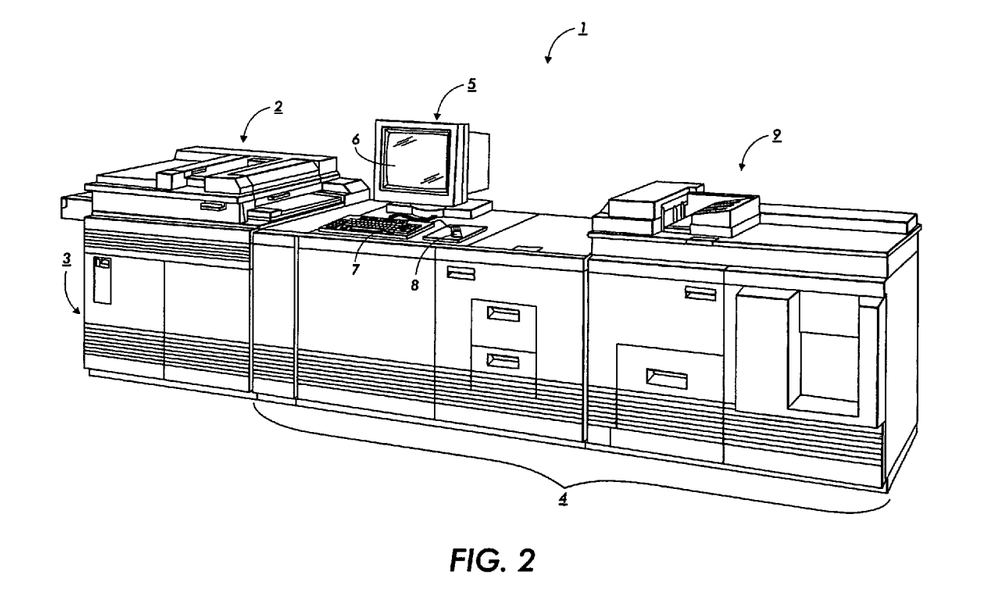
FIG. 2 illustrates an exemplary embodiment of an imaging system according this invention that uses job tickets.

Referring to FIGS. 1 and 2, an exemplary imaging device 1 may be divided into, for example, a scanner section 2, a controller section 3, a printer section 4, and optionally a finisher section 9. The controller section 3 may include one or more of a user interface 5, an interactive touch-screen display 6, a keyboard 7, and a mouse 8. The finisher section 9 is used to stitch, staple, bind or otherwise provide a finishing operation to documents output by the printer section 4.

Using the imaging system 1, or any other known or later-developed printer systems, to output a document or set of documents according to a desired set of parameters, such as paper size, simplex or duplex, page numbering, image shift or the like, can be very user unfriendly. Conventionally, the various parameters would be determined after the document file was created and concurrently with the printing request. Accordingly, a job ticket 10, as shown in FIG. 1, for example, would be created by an operator to individually select the parameters desired. The operator typically inputs, for example, the desired paper size, any desired reduction/enlargement percentage, which sides are to be imaged (simple or duplex), and/or one or more image quality parameters such as those shown in the Basic parameter box 11. The values for the various implemented parameters may be input to the imaging system 1 via any of the keyboard 7, the mouse 8 or the touch screen display 6. Of course, any number of additional parameters, and/or combinations of parameters, may be available and the values for these additional parameters input by the operator other than, or together with, those shown in the Basic parameter box 11.

The operator's input of the values for various parameters, such as those identified in Basic parameter box 11 of FIG. 1, is a time consuming task that is subject to operator error, particularly when the operator is unfamiliar with the job ticket process or when numerous different parameters are required to be input to produce the desired document or set of documents from the imaging system 1.

Figure 3:
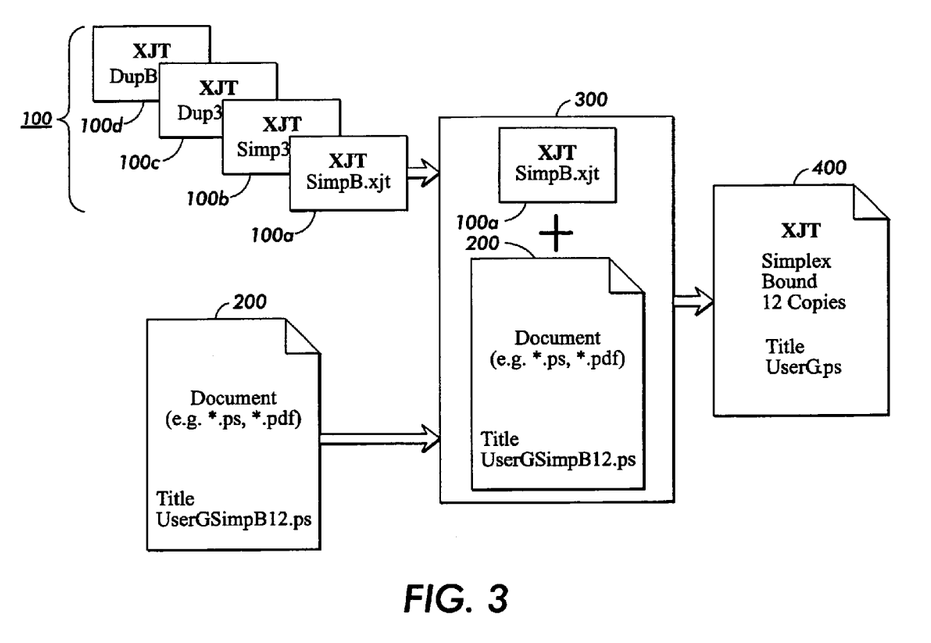
FIG. 3 diagramatically illustrates an exemplary embodiment of printing job files via a corresponding job ticket according to this invention.

FIG. 3 illustrates an exemplary embodiment of the process for producing a desired document or set of documents of designated parameters from the imaging system 1 according to this invention. The controller section 3 of the imaging system 1 has a non-volatile memory (not shown) onto which a set 100 of one or more preconfigured job tickets, such as the job tickets 100*a*–100*d*, for example, are stored. Each job ticket 100*a*–100*d*, for example, can be used to automatically produce a document or set of documents according to the parameters set in one of job tickets 100*a*–100*d*, for example, when a document file having an appropriate corresponding job ticket appended is submitted to the imaging system 1.

For example, the first job ticket 100*a* is preconfigured to produce documents that are single-sided (simplex) and bound (B). Thus, job ticket 100*a* can be stored using the file name "SimpB.xjt", where the name portion "SimpB" can be used to describe one or more of the parameter values set in that job ticket and the extension "xjt" identifies this file as a prestored job ticket file. Whenever a file name of a document submitted to the imaging system 1 includes the name portion "SimpB" of the stored "SimpB.xjt" job ticket 100*a*, a document or set of documents, which will be single-sided (simplex) and bound (B), will automatically be produced according to all of the parameters set in the "SimpB.xjt" job ticket 100*a*.

Of course, the set of job tickets 100 may include, for example, any number of job tickets that the non-volatile memory of the printing system 1 is capable of storing. Additional job tickets may therefore be added as needed.

Once the set 100 of job tickets, such as job tickets 100*a*–100*d*, for example, has been created and stored in the non-volatile memory of the imaging system 1, a user is able to access any job ticket repeatably whenever a document file is provided with a text string embedded in the file name that corresponds to the name portion of one of the previously configured and stored job tickets, for example, the job tickets 100*a*–100 *d*, of the set 100 of job tickets.

FIG. 3 shows, for example, a document file 200 saved using the file name "UserGSimpB12.ps". The inclusion of the text string "SimpB" in the name of the document file 200 corresponds to the "SimpB.xjt" job ticket 100*a*, for example, that has been previously configured and stored in the non-volatile memory of the imaging system 1. Thus, the "SimpB.xjt" job ticket 100*a* is appended to document file 200 named "UserGSimpB12.ps" to form a combined imaging document 300, as shown in FIG. 3. As a result, the job ticket 100*a* is immediately available to produce a document or set of documents for the document file 200 named "UserGSimpB12.ps" according to the values set in the "SimpB.xjt" job ticket 100*a*, for the implemented parameters once the combined imaging document 300 is submitted to the imaging system 1 for processing.

Further, FIG. 3 shows that embedding a numerical quantifier, such as, for example "12" in the document file 200 named "UserGSimpB12.ps" enables the preconfigured job ticket 100*a*, for example, to automatically identify the value of a parameter that is flagged as able to accept user input values. In this example, in the pre-configured job ticket 100*a* the number of copies parameter can be set to a user-supplied value of the quantity of documents to be printed, when the document file 200 and job ticket 100*a* are combined to form combined imaging document 300. In this example, the value for the number of copies is 12. Thus, when combined imaging document 300 is submitted to the printing system 1, as shown in 400 of FIG. 3, 12 simplex bound copies of the "User G" document are produced.

Of course, any numerical quantifier may be added to the name of the document file 200 to vary the number of documents produced. If no numerical quantifier is added to the name of the document file 200, then a default quantifier of, for example, one, is supplied by the corresponding job ticket 100*a*, for example, when the combined imaging document 300 is submitted to the imaging system 1 for printing, for example. As a result, only one document is printed according to the default parameter. The default parameter may be set differently than "one" as desired.

Figure 4:
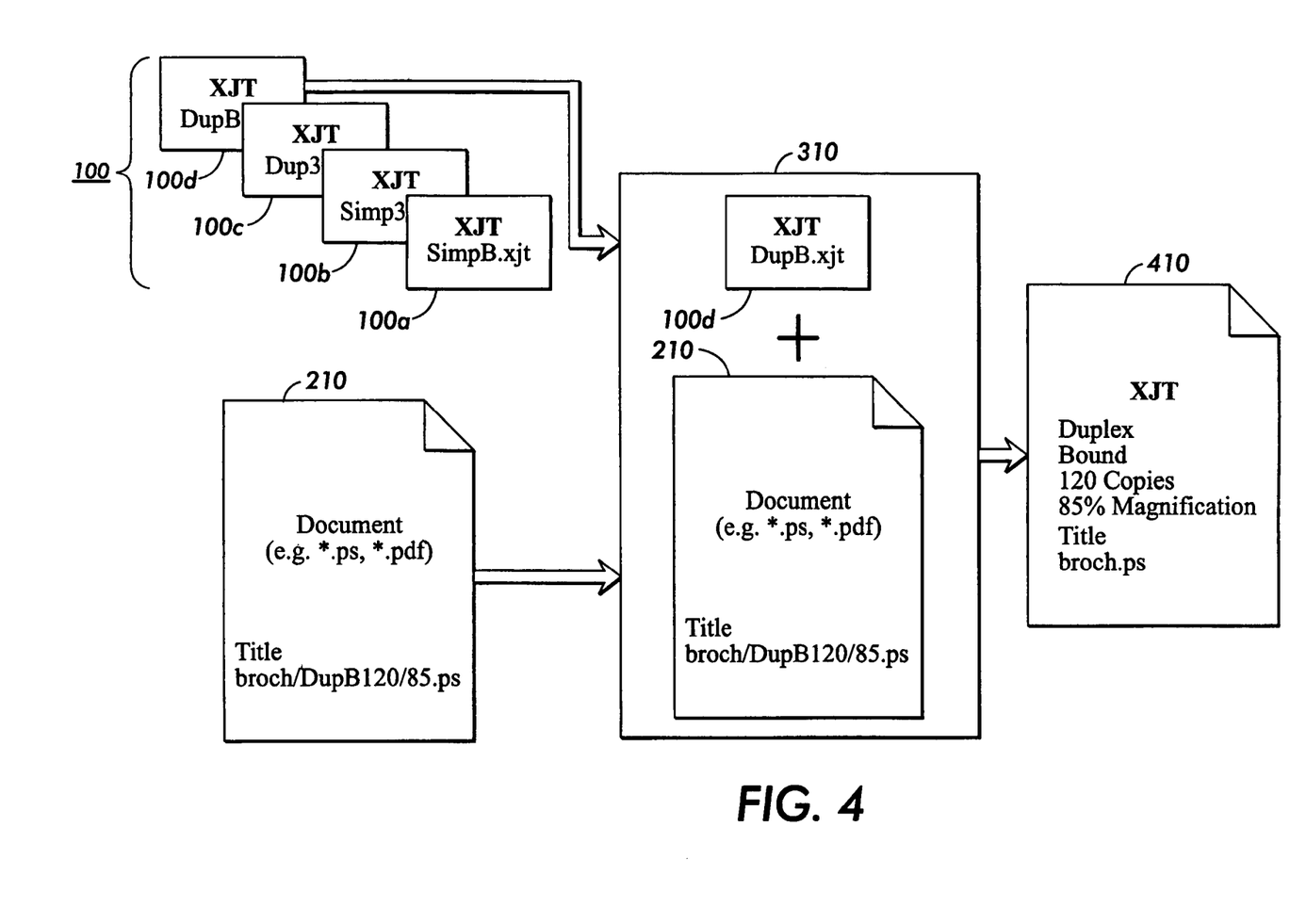
FIG. 4 diagramatically illustrates another exemplary embodiment of printing job files via a corresponding job ticket having additional parameters according to this invention.

Of course, parameters able to accept user-supplied values in addition to, or other than, the number of documents to be printed may be implemented in a particular one of the job tickets 100*a*–100*d*, with a corresponding numerical quantifier of value added to and embedded in the name of a document file before the document file is submitted to the imaging system 1 for processing. FIG. 4 shows, for example, a document file 210 named "broch/DuplexB120-85.ps". The "DupB.xjt" job ticket 100*d* has two parameters, number of copies and percentage of magnification/reduction, that are able to accept user-supplied values. Thus, for example, the document file 210 is for a brochure requiring duplex printing of 120 bound copies at 85 percent magnification. Accordingly, this document file 210 corresponds with the preconfigured job "DupB.xjt" job ticket 100*d*, for example. The "DupB.xjt" job ticket 100*d* has the magnification/reduction parameter set to "user", for example. As a result, rather than using a fixed magnification/reduction percentage, the file name of the document is parsed to determine the user-supplied percentage. This document file 210 is then matched with the "DupB.xjt" job ticket to yield a combined imaging document 310. The combined imaging document 310 is then submitted to the imaging system 1 to produce output document 410 comprising the 120 duplex, bound copies of the brochure at 85 percent magnification as desired. Thus, by embedding text strings and parameter values in a document file name, and matching the document file with a corresponding pre-configured job ticket based on the text strings and/or parameter values, the need to create an individual, one-shot, job ticket concurrently with a printing request is reduced.

Figure 5:
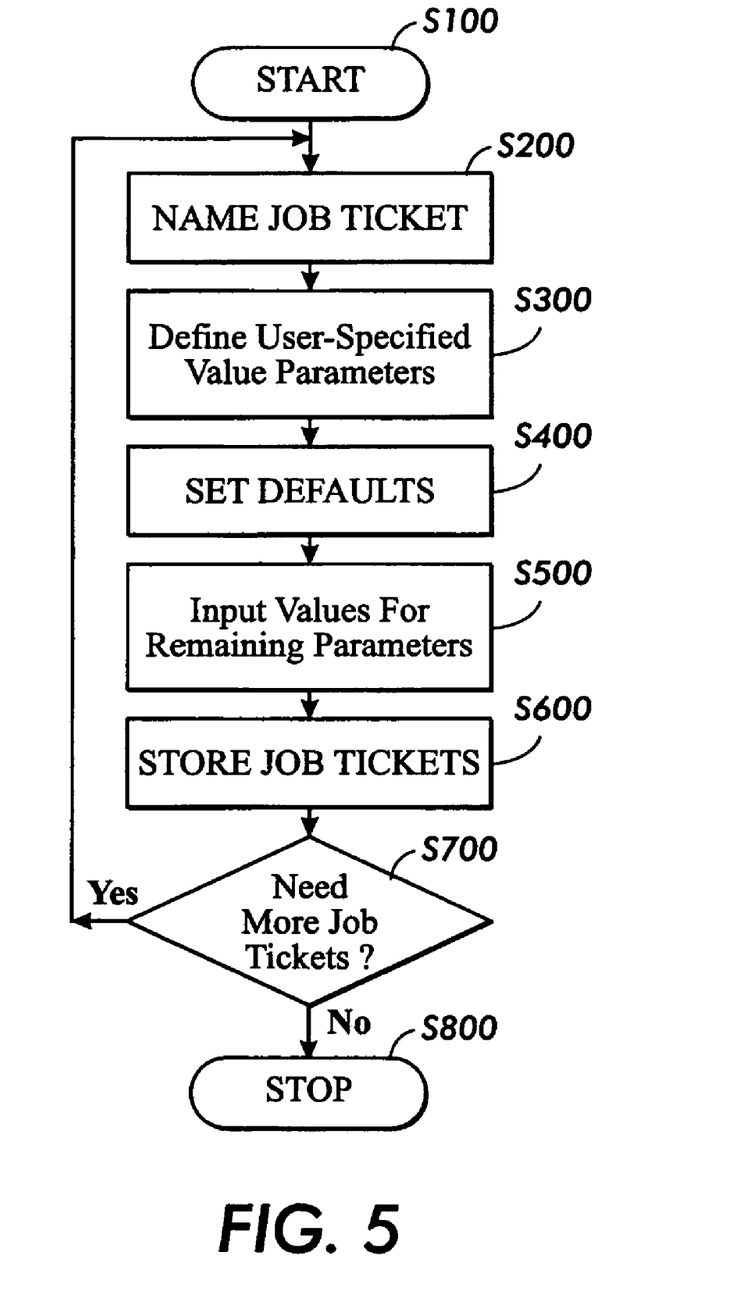
FIG. 5 is a flowchart outlining one exemplary embodiment of a method for creating job tickets according to this invention.

FIG. 5 is a flowchart outlining one exemplary embodiment of a method for creating, setting and saving a preconfigured ".xjt" job ticket according to this invention. Beginning in step S100, the process proceeds to step S200, where a job ticket of preconfigured parameters is named. The name may be, for example, "SimpB.xjt" as in job ticket 100*a* of FIGS. 3 and 4.

Next, in step S300, zero, one or more parameters of the job ticket are defined as able to be input as user-supplied values via the file name in accordance with the systems and methods of this invention. In general, these parameters will take numerical values, as in the examples outlined above. However, it should be appreciated that non-numbered valued parameters, such as output tray, finish, or the like, could also be defined as taking user-supplied values. However, this could result in extremely long file names. Alternatively, such non-numbered valued parameters could be assigned a numerical value, or other character, that would be used in a document file name to identify the desired non-numbered values for a particular parameter. Operation then continues to step S400.

In step S400, default values are defined for each of the zero, one or more parameters defined in step S300 that take user-supplied values. Then, in step S500, values for all of the remaining parameters of the job ticket are input. Next, in step S600, the job ticket is stored using a file name that is descriptive of one or more of the values for parameters that are important in that job ticket. Operation then continues to step S700.

In step S700, a determination is made whether more job tickets are to be created. If so, then the process reverts back to step S200. If not, then the process is completed. Accordingly, operation continues to step S800, where the method ends. As a result, the necessary preconfigured job tickets, such as the set 100 of job tickets 100*a*–100*d*, for example, are repeatably available to be appended to a corresponding document file as provided, for example, in the process set forth in FIG. 6.

Figure 6:
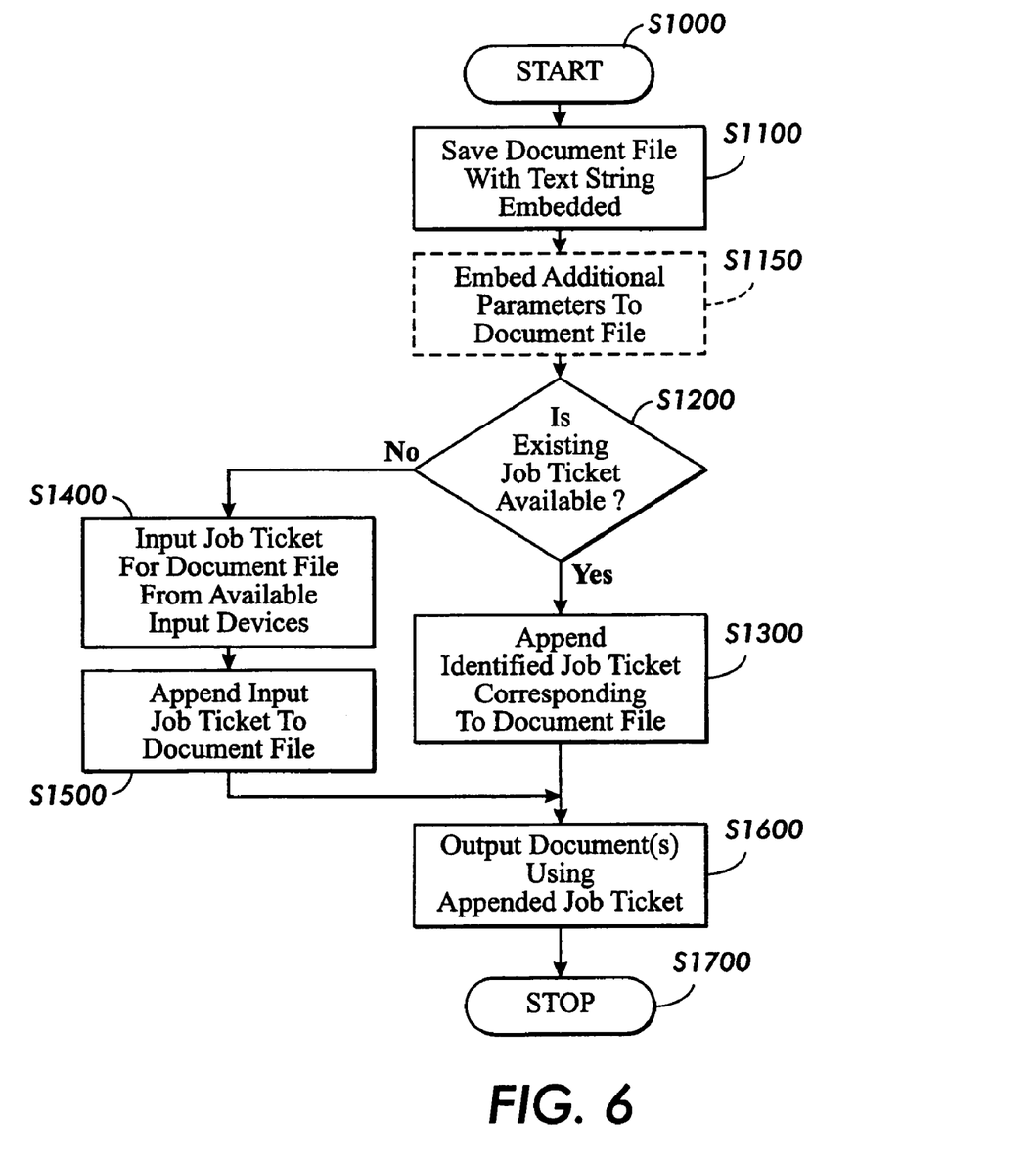
FIG. 6 is a flowchart outlining one exemplary embodiment of a method for printing job files via a corresponding job ticket according to this invention.

FIG. 6 is a flowchart outlining one exemplary embodiment of a method for producing a document or set of documents according to the systems and methods of this invention. Beginning in step S1000, operation continues to step S1100, where the document file desired to be printed is saved so that the file name contains a text string embedded in the document file name. The embedded text string in the saved document file name corresponds to the name portion of one of the ".xjt" job tickets, for example, the job tickets 100*a*–100*d*, of the set 100 of job tickets that were previously configured and stored on a non-volatile memory of the imaging system.

Then, in step S1150, values of one or more parameters that take user-supplied values may optionally be embedded in the document file name to provide further imaging instructions to the imaging device when the document file with the embedded text string and the zero, one or more additional parameter values are submitted to the imaging system to output a document or set of documents.

In step S1200 a determination is made whether a preconfigured job ticket exists that corresponds to the embedded text string saved into the document file name as saved in step S1100. If a pre-configured job ticket exists that corresponds to the embedded text string, operation continues to step S1300. Otherwise, operation jumps to step S1400.

In step S1300, the corresponding job ticket is appended to the document file. In contrast in step S1400, a new job ticket is created using conventional job ticket creation methods. Then, in step S1500, the newly created job ticket is appended to the corresponding document file. Operation then continues to step S1600.

In step S1600, the document file with the appended job ticket is submitted to the imaging system to output the desired document, or set of documents, according to the values set forth in the appended job ticket and, if provided, any values for user-supplied parameters embedded in the document file name. Then, in step S1700, once the document, or set of documents are output as desired, the method ends.

By way of example only, with reference to the exemplary method described in FIG. 6, a document's initial or original file name may be "broch.ps". A previously configured job ticket named "DupB.xjt" may provide duplex bound print copies. According to step S1100, the document file name "broch.ps" is changed by embedding at least the text string "DupB" into the file name, such that the document file name becomes "brochDupB.ps". As a result, the document file with the text string embedded, i.e., "brochDupB.ps" may be matched with a corresponding job ticket named "DupB" that provides at least the duplex bound features in its job ticket service. Because no numerical quantifier is included in the document file name "brochDupB.ps", then only the default values for the number of documents, and for any other user-supplied value parameter enabled in the "DupB.xjt" job ticket, would be provided when the corresponding job ticket is appended to the document and the document and appended job ticket is submitted to the imaging system 1.

The exemplary document file saved as "brochDupB.ps" may optionally be further altered, according to step S1150, to embed values for one or more additional parameters in the document file name. Thus, for example, the document file may instead be further named as "brochDupB120-85.ps". Such additional numerical parameters of "120" and "85", delimited by any desired character, such as, for example "-", indicate that 120 documents are to be output at 85 percent magnification, for example, when the document file and the appended corresponding "DupB.xjt" job ticket are ultimately submitted to the imaging system.

Additional parameters provided in a document file name, such as the "120" and "85" parameters in document file name "brochDupB120-85.ps" discussed above with respect to the quantity of documents generated and the magnification of the image provided on the documents generated, are exemplary only. It should be appreciated that, as discussed above, the value for any parameter in a job ticket is available for representation in a document file name, such as, for example, the degree of rotation of the image, the page numbering, the sharpness/contrast levels, or the like. In general, all that is necessary is that the job ticket indicate that a value for a particular parameter can be supplied by embedding the value for that parameter in the received document.

While this invention has been described in conjunction with the exemplary embodiments outlined above, it is evident that many alternatives, modifications and variations may be apparent to those skilled in the art. Accordingly, the exemplary embodiments of the invention, as set forth above, are intended to be illustrative only, not limiting. Various changes may be made without departing from the spirit and scope of the invention.

What is claimed is:

1. A method for generating at least one hard-copy document using an image forming system without creating a concurrent individual job ticket for that at least one hard-copy document, the image forming system having a memory that stores at least one pre-configured job ticket having parameters for producing at least one document, the method comprising:

saving a document file having an embedded text string in the document file name and the embedded text string corresponds to at least one of the at least one pre-configured job tickets;

appending the pre-configured job ticket that corresponds to the embedded text string to the document file; and outputting the at least one document according to the document file and the appended job ticket.

2. The method of claim 1, further comprising embedding at least one additional parameter value into the document file name, each embedded parameter value recognizable by the pre-configured job ticket that corresponds to the embedded text, wherein outputting the at least one document comprises outputting the at least one document according to the document file, appended job ticket and the at least one additional parameter value.

3. The method according to claim 1, further comprising:
determining whether any of the at least one pre-configured job tickets correspond to the embedded text string in the document file name;
creating at least one additional job ticket using at least one input device when none of the at least one pre-configured job tickets correspond to the embedded text string;
appending the created job ticket to the document file; and
outputting at least one document according to the document file and the appended job ticket.

4. A method, for an image forming system having a memory, of creating at least one pre-configured job ticket, comprising:
naming a job ticket;
defining zero, one or more parameters that are able to take a user-supplied value for the job ticket;
setting default values for each such parameter that is able to take a user-supplied value;
inputting values for any remaining parameters for that job ticket;
storing that job ticket in the memory of the image forming system; and
associating the job ticket when an embedded text string in a document file corresponds with job ticket name.

* * * * *